March 24, 1953  R. L. MONTGOMERY, JR  2,632,706

METHOD OF ROASTING COFFEE

Filed April 25, 1950  2 SHEETS—SHEET 1

INVENTOR.
Robert L. Montgomery Jr.
BY Joshua R. H. Potts
His Attorney

March 24, 1953　　　R. L. MONTGOMERY, JR　　　2,632,706
METHOD OF ROASTING COFFEE
Filed April 25, 1950　　　　　　　　　　　　　2 SHEETS—SHEET 2
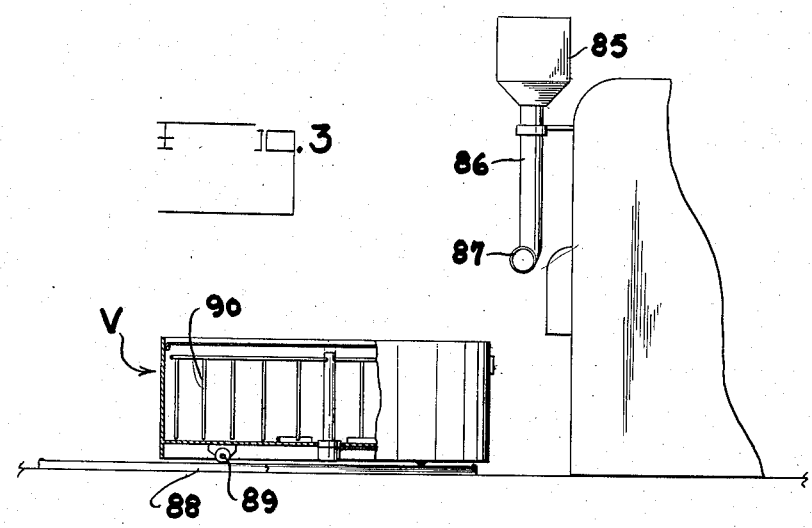
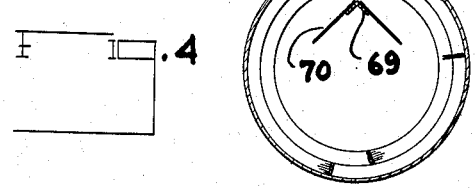
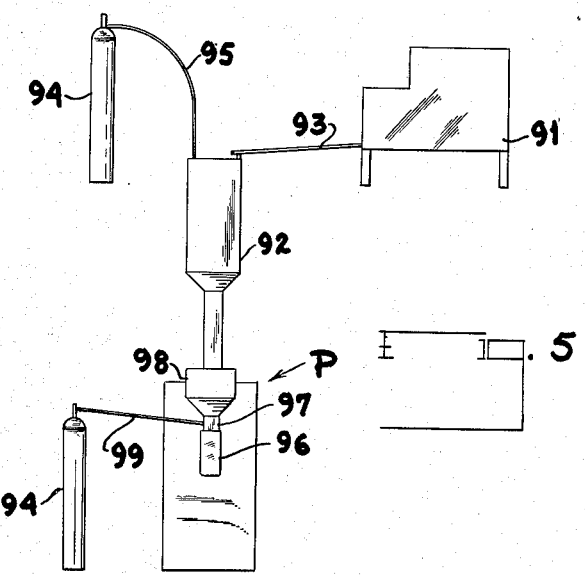
INVENTOR.
Robert L. Montgomery Jr.
BY Joshua R. H. Potts
His Attorney Patented Mar. 24, 1953

2,632,706

UNITED STATES PATENT OFFICE 2,632,706

METHOD OF ROASTING COFFEE

Robert L. Montgomery, Jr., Bala-Cynwyd, Pa., assignor to Wm. Montgomery Company, Philadelphia, Pa., a corporation of Pennsylvania Application April 25, 1950, Serial No. 157,913

5 Claims. (Cl. 99—68)

The present invention deals with the roasting of coffee beans and is concerned primarily with a novel roasting method and the apparatus which is necessary for carrying out this method.

The business of selling coffee to the consuming public is highly competitive. Coffee drinkers are particularly conscious of the quality of the coffee which they drink. They are fully aware of such properties as aroma, flavor, body and thickness, and when the coffee produced by any particular coffee roaster is deficient in some of these properties, the consumer becomes cognizant of that fact. If a coffee roaster is to maintain a good position in this highly competitive field his product must have these properties and qualities to a degree at least comparable to those of his competitors.

At the present time the known methods of roasting coffee beans are characterized by the fact that they utilize a heat of a dry, searing nature. Such a heat extracts an excessive amount of the moisture content from the coffee bean and does not roast the beans uniformly. Moreover, with the now known apparatus for supplying the heat to the roaster it is highly impractical, if not impossible, to maintain uniformity in the heat. Such factors as changes in fuel pressure and atmospheric conditions affect the heat to cause variations therein. Moreover, with the now known roasting methods forced drafts are employed. These drafts pass through the roaster and carry away steam and vapors from the coffee beans. These vapors include the essential oils and flavor ingredients of the coffee, so what actually takes place is that a large proportion of the real goodness of the coffee is dissipated during the roasting processes.

With the foregoing conditions in mind the present invention has in view as its foremost objective the provision of a method for roasting coffee in which the fuel pressure and quality of the flame is accurately controlled so as to achieve real uniformity in the heat supplied to the roaster.

Another object is to provide a coffee roasting process in which the heat is generated by a flame that is located in an external combustion tunnel that is positioned adjacent to and in communication with the roasting chamber.

Still another object is to provide a coffee roasting method along the above noted lines in which the steam and vapors from the coffee beans are supplemented by additional moisture which is introduced into the roasting chamber with the heat.

A coffee roasting method which is carried out in accordance with the above noted objectives will result in uniformly roasted beans. All smoky tasting tipped or burnt beans are substantially eliminated. The roasting period may be substantially reduced, and shrinkage in the beans themselves, which ordinarily takes place during the roasting period, is also reduced.

Another highly important object of the present invention is to provide, in a coffee roasting process, the step of roasting the coffee in a roasting chamber that is sealed in, so as to retain the steam and vapors which emanate from the coffee in the chamber. With such an arrangement the coffee is actually basted in its own steam.

During the period in which the roasting takes place it is desirable to remove chaff from the roasting chamber and there are certain conditions under which internal pressure must be relieved. Thus, another important object of the invention is to provide, in a coffee roasting process, the step of removing chaff and relieving internal pressure from a roasting chamber that is otherwise sealed in.

Those skilled in the art of roasting coffee now recognize that a certain definite order of the changes in temperature during the roasting period is absolutely necessary to achieve a product of high quality. This order is characterized by the fact that the temperature of the coffee beans rises rather slowly during the major portion of the roasting period, that is, the rise in temperature is slow and gradual until the last few minutes of the roasting period. During these last few minutes the temperature increases rapidly and the roasting period must be terminated by quenching at an accurately predetermined time. This quenching at the proper moment is of the utmost importance in providing a quality product.

With the now known methods and apparatus the operator relies upon his visual perception in determining when the quenching should take place to terminate the roasting period. He depends upon the appearance of the coffee beans. The appearance of the roasted beans will vary with dull or sunny skies, artificial light, the fatigue of the operator, and other elements which enter into the human equation. Thus, as a practical matter, it is impossible to achieve uniformity throughout different roasts.

With these conditions in mind, another highly important object of the invention is to provide a method of roasting coffee in which the roasting period is accurately controlled so as to insure that quenching will take place at the proper moment. This object is achieved by employing certain recording apparatus which records temperature changes during the roasting period and which will indicate exactly when the period is to be terminated.

Another highly important object of the present invention is to provide apparatus for carrying out a method which will fulfill the above noted objects. While a large proportion of this apparatus is standard equipment which may be purchased as such from the manufacturers, certain special devices are included, and the equipment is arranged in a novel order so as to provide in effect a novel roasting apparatus when it is considered in its entirety.

It would avail but little to provide a method of roasting coffee which results in improved properties of aroma, flavor, body and thickness if these qualities were lost after grinding. The coffee which is sold to the retail trade is ordinarily ground and packed in some form of container.

Another highly important object of the invention is to provide new and improved methods for handling the coffee after grinding and during the packaging thereof, and which methods result in retaining all of the desirable properties in the coffee. This object is achieved by immersing the coffee immediately after grinding in a surrounding atmosphere of carbon dioxide gas and introducing carbon dioxide gas into the packages as the ground coffee is packed therein so as to substantially eliminate all air from about the ground coffee.

Various other more detailed objects and advantages of the invention, such as arise in connection with carrying out the above noted ideas in a practical embodiment, will in part become apparent and in part be hereinafter stated as the description of the invention proceeds.

The invention therefore comprises a novel method of roasting coffee in which the flame for heating the roasting chamber is generated in an external combustion tunnel. The fuel pressure for this flame and the quality of the flame itself is accurately controlled and moisture is introduced into the roasting chamber with the heat. The roasting chamber is completely sealed in except for a special draft which provides for the removal of chaff and the relieving of internal pressures. The temperature during the roasting period is accurately controlled and recorded.

The invention also embraces certain steps in conjunction with the grinding and packaging of roasted coffee which preserves the desired qualities therein, together with the apparatus for carrying out the foregoing methods.

For a full and more complete understanding of the invention, reference may be had to the following description and accompanying drawings, wherein:

Figure 3 is a side view of one end of the roaster, and the cooling vat which receives roasted beans, with the latter broken away and shown in section;

Figure 4 is a detailed sectional showing of a portion of the roaster bringing out particularly the disposition of the shed therein; and Figure 5 is a diagrammatic illustration of the grinding and packaging apparatus and illustrates the manner in which carbon dioxide gas is introduced as the surrounding atmosphere of the coffee after it is ground.

Figure 1:
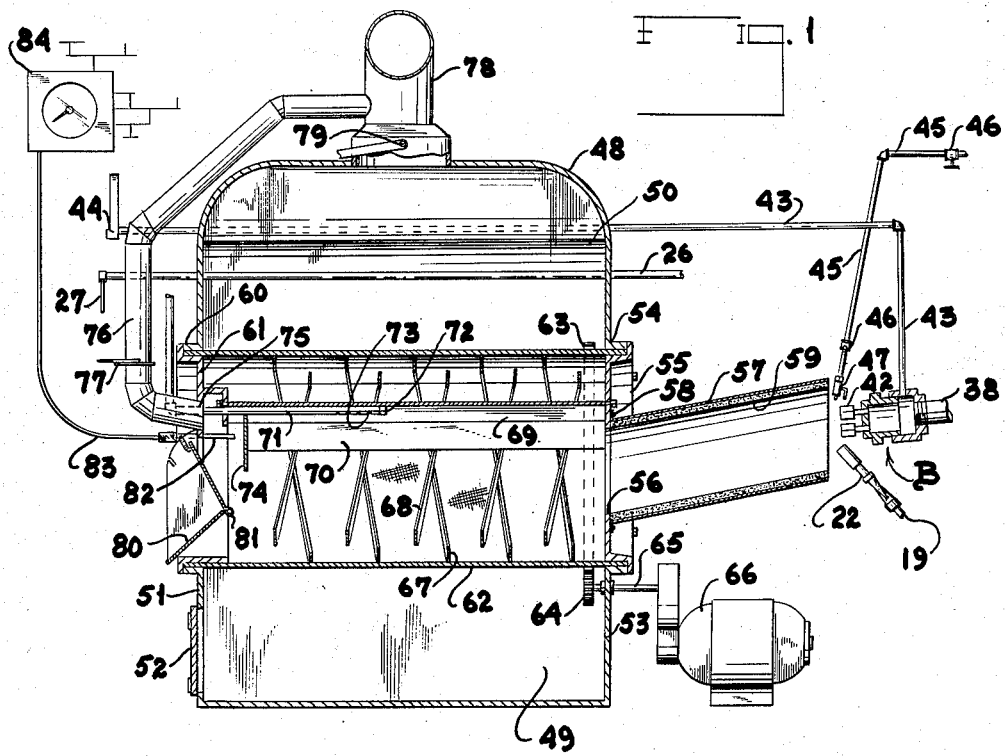
Figure 1 is a side view taken as a vertical section through a coffee roaster which is designed to carry out the methods of this invention, with certain auxiliary elements represented in elevation and somewhat diagrammatically.

Before referring to the drawings, it will be noted that the process of this invention does not adulterate or add any foreign substance to the coffee. It merely develops and brings out the natural qualities of the coffee to a higher degree than the now known processes.

In view of this fact, the preparation of the green coffee beans prior to roasting is highly important, although not an actual part of the roasting process. Each blend which is introduced into the roaster should be accurately prepared so as to include the various types of beans in their required proportions and it should be thoroughly cleaned to remove all foreign particles such as stones, dirt, string, dust, metal, and the like.

Figure 2:
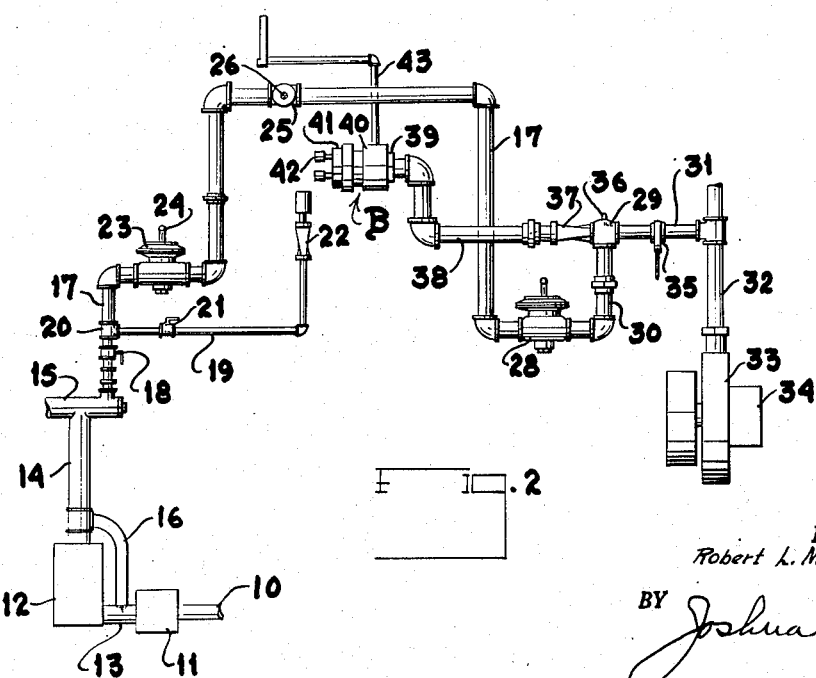
Figure 2 is an elevational view illustrating the various pipes and conduits and associated instrumentalities which enter into the fuel supply. This view is also somewhat diagrammatical.

Referring now to the drawings, and first more particularly to Figure 2, apparatus which may be employed for carrying out the coffee roasting methods of this invention will be described.

Ordinarily, a producer of roasted coffee will employ more than one roaster. He will also avail himself of the gas that is supplied by the public utility for his fuel. This gas will be introduced into the premises by a main supply line, which is represented at 10 in Figure 2, and this supply line leads to a meter designated 11. The pressure of the gas which comes from the main 10 will vary in proportion to the industrial and home consumption. So far as the present methods are concerned, such variations are highly undesirable and if not eliminated will materially impair the efficacy of the roasting process. In order to eliminate these variations a standard pressure blower which is commonly known as a booster is installed next to the meter 11 and is designated 12. A conduit 13 connects the meter 11 to the booster 12 and another conduit 14 extends from the booster 12 to a manifold pipe 15. One or more roaster feeder lines are tapped into the manifold pipe 15 as will be later described.

Ordinarily the meter 11 will be located in the basement of the particular premises where the apparatus is installed. The booster 12 is located as close to the meter 11 as is feasible so as to afford as great an extent of pipe between the booster and the roasters. The greater the extent of this pipe, the more even and steady will be the pressure of the fuel. Ordinarily the booster 12 will be turned on and off by a switch that is located in close proximity to the roasting apparatus proper.

Extending from the pipe 14 back to the gas main 13 is a by-pass 16 which is included for the purpose of preventing the building up of excess pressures in the roaster feeder lines when any roaster is shut down for a short period.

As above explained, one or more roaster feeder lines may be tapped into the manifold pipe 15. For the purposes of this specification only a single such feeder line will be described, as only one feeder line is illustrated in the drawing. This feeder line is represented at 17, and it will be noted that it includes a stopcock at 18 which may be employed to completely shut off the fuel for any roaster.

A pilot flame supply line 19 is shown as connected to the roaster feeder line 17 by a T-fitting 20. The pilot flame supply line 19 includes a cut-off valve in the form of a stopcock 21, and at its free end carries a standard pilot nozzle 22 which is located adjacent to the burner, as will be later described. It is important to note that the pilot line should be the first installation on the roaster feeder line closest to the manifold pipe 15, so that it may be permitted to burn constantly and will not interfere with the accurate adjustment of the fuel mixer, as will be later described.

Just beyond the pilot line connection 20 the roaster feeder line 17 is provided with a standard diaphragm type gas line governor designated 23. This governor is included for the purpose of maintaining constant and uniform the pressure of the gas which is supplied to the mixer. It may be adjusted to vary the pressure of the gas, and the adjusting instrumentality is represented at 24. Ordinarily, this governor 23 will be set to provide a pressure corresponding to a water column range from 4 to 6 inches. Once set for this particular pressure the governor requires no further adjustment and ordinarily should not be tampered with.

The importance of the governor 23 becomes apparent when it is recognized that one roaster might be shut down while another remains in operation. Without this governor this would result in a variation of pressure from the manifold pipe 15.

It is important that the flame in the roaster burner be shut on and off at the will of the operator. For this purpose a control valve is provided, as indicated at 25. This control valve preferably takes the form of a stopcock and is operated by a rod 26 which, as shown in Figure 1, extends through the hood of the burner to the front thereof, where it is provided with an operating lever 27 which is conveniently accessible to an operator in front of the roaster.

From this control valve 25 the roaster feeder line 17 is continued over to a diaphragm type governor represented at 28. This governor 28 is included as one element of a low-pressure proportional mixer. This mixer also includes a mixing T 29 which is connected to the governor 28 by a conduit 30. Air is supplied to the mixing T 29 by a pipe 31 which is connected through the medium of another pipe 32 will a blower 33. The latter includes an air intake at 34 which may be connected to any appropriate source of supply of clean, fresh air. Ordinarily it will be connected to a standpipe (not illustrated), which insures of the supply of clean, fresh air. The air line 31 also includes a blast escape valve 35 which may be adjusted to vary the amount of air which is admitted to the mixing T 29. The latter also includes an adjusting element indicated at 36. It is this adjusting screw 36 which determines the proportion of air and gas which is mixed to form the combustible mixture.

It is by adjusting the mixing T 29 through the medium of the adjusting screw 36 that the quality and character of the flame is controlled. When properly adjusted, the flame should throw a radiant heat into the roasting chamber, and this flame should show no flicks or tongues of color. The length of the flame should approximate that of the external combustion tunnel to be later described.

The throat of the mixing T 29 is represented at 37 and is of an increasing diameter away from the T. It is connected through the medium of a conduit 38 with the burner, which is referred to in its entirety by the reference character B. The burner B comprises a bushing 39 of a diameter greater than the pipe 38 to which it is connected. Secured to the bushing 39 is a coupling 40 which is provided with a cap 41. Mounted on the face of the cap 41 are four burner nozzles 42 equidistantly spaced apart.

Connected to the top of the coupling 40 is a pipe 43 which extends to the front of the roaster, as illustrated in Figure 1, where it is connected to a water column combustion gauge represented at 44. This gauge 44 indicates the pressure of the fuel mixture at the burner and may be availed of in adjusting and maintaining a desired length in the flame.

As above explained, an important phase of the method of this invention is the addition of moisture to the roasting chamber as heat is applied thereto. To accomplish this, external water jets are employed. To provide these jets a pipe line 45 extends to an appropriate source of water supply. Included in this line 45 is a stopcock 46. The line 45 extends downwardly to a point above the burner B. Connected to the lower end of this line 45 is a T 46 presenting two arms, each of which has one end above and in front of one of the burner nozzles 42. Each arm of the mixing T 46 is provided with an adjusting valve 47 which may be adjusted to vary the amount of water which emerges from that arm of the T. Obviously, the water coming from the external jets is converted into steam as it passes through the combustion tunnel into the roaster chamber.

*The roaster*

While all of the structural details of the roaster are not illustrated in the drawings or herein described, certain salient features which are pertinent to the method of this invention are illustrated and will now be described. As above explained, the maintaining of the steam in the roasting chamber is an important phase of the process. In order to accomplish this the cover for the roasting chamber which is designated 48 is connected to the side walls 49 by steam-tight joints such as represented at 50, which are caulked. Both the cover 48 and the sides 49 preferably are of stainless steel, with the sides 49 running down to the floor. The front wall of the roaster which is represented at 51 may be provided with a chaff cleanout door 52 which is located at the bottom below the roasting chamber.

The rear wall of the roaster is designated 53 and is formed with an opening defined by a flange 54. Secured to the outer edge of this flange 54 is a cup-shaped member 55 formed with a central opening 56. The external combustion tunnel is designated 57 and has inner end flanges which are bolted to the cup-shaped member 55 as indicated at 58. This tunnel 57 is lined with an appropriate refractory lining such as a well-known ramming cement. This lining is designated 59 and should be effective to reflect heat into the roasting chamber.

The open end of the tunnel 57 may be covered with a heavy gauge steel end plate (not illustrated). This plate is formed with an orifice in which the burner is centered.

The front wall 51 is also formed with an opening defined by a flange 60. Fitted into this opening is another cup-shaped member 61, the cylindrical wall of which is spaced from the flange 60. The cylindrical wall of the member 55 is also spaced from the flange 54, and these spacings provide for the rotating mounting of the roasting drum 62. The latter is provided with an external ring gear 63 which meshes with a pinion 64 that is drivably mounted on a shaft 65 which is journaled in the rear wall 53 and which is drivably connected to an electric motor 66. Thus the motor 66 serves to rotate the drum 62. The latter is formed with two sets of mixing blades 67 and 68 which serve to agitate the coffee beans within the drum.

Extending between the members 55 and 61 is an angle iron 69 (see Figure 4) which supports a coffee shed 70 that is fixedly positioned within the drum. Also supported within the apex of this angle iron 69 is a pipe 71, the inner end of which is capped as shown at 72 with the portion adjacent to the cap being formed on its lower face with a plurality of openings 73. The pipe 71 extends through an opening in the member 61 and is continued out to an appropriate source of water supply. This pipe 71 provides the jets for internal quenching.

A baffle plate 74 may be supported at the front end of the shed 70 for the purpose of deflecting heat which ordinarily might pass out the discharge door when the latter is opened.

The member 61 is formed with another opening at 75 in which is fitted one end of a special draft conduit 76. Included in this draft conduit 76 is an adjustable damper 77 which may be adjusted to vary the effective cross-sectional area of the pipe. This pipe 76 is continued up over the roaster to a point where it is connected to the main exhaust pipe 78 above the damper 79 therefor. Thus, when the damper 79 is closed to seal in the roasting chamber, the special draft pipe 76 may be opened to remove chaff from the roasting chamber or relieve internal pressures therein.

The discharge door for the roaster is represented at 80 and is of a well-known type. It is pivotally mounted, as indicated at 81, on the member 61. In the position illustrated in Figure 2 it closes the roasting chamber, but it may be swung back to discharge the contents of the drum 62 as the latter rotates.

A thermocouple is designated 82 and is shown as extending into the roasting chamber from the member 61 in the front wall. A wire 83 connects this thermocouple with an appropriate recording instrument which is represented at 84. The latter is located in a position in which it may be conveniently seen by the operator. This recorder 84 accurately records the temperature of the coffee during the roasting period because the coffee beans fall over the thermocouple 82 as the drum rotates.

As shown in Figure 3, a hopper 85 is mounted on the front of the roaster and is adapted to receive the coffee to be roasted. A conduit 86 is connected to the bottom of this hopper and terminates in a spout 87 which may be swung into the open door to charge the roaster with coffee to be roasted.

A cooling vat for receiving roasted coffee is represented at V and is shown as mounted on tracks 88 by rollers 89. This vat includes power-driven agitating blades 90 which serve to agitate the coffee beans during cooling. Obviously, the vat V may be pulled up in close proximity to the discharge door 80 when coffee is to be discharged from the roaster.

*Roasting method*

With apparatus substantially of the character above indicated available, the roasting method of this invention may be accomplished in the following manner:

Before a roasting period actually begins the damper 79 is opened and an exhaust blower which is associated with the main draft pipe 78 is turned on to purge the roaster and its associated system of stale air and any gases which may be accumulated therein.

The pilot nozzle 22 is now lit to provide a pilot flame and the motor 66 turned on to start the drum 62 into operation. The proportional mixer 36 is turned on and the blower 33 started in operation to supply air to the mixer 36.

The booster 12 is also started in operation to insure of adequate pressure in the gas. The recording instrument 84 is now started in operation and the external water jets 46 opened to supply water immediately in front of the burner.

The roaster is now in condition for roasting a batch of coffee. The damper 79 is completely closed and the batch of green coffee which is to be roasted is fed into the drum 62 through the open door by means of the discharge spout 87. Gas in the roast feeder line 17 is now turned on by opening the valve 25 by means of the operating lever 27. After all the green coffee is in the roaster the door 80 is completely closed.

As the roasting period takes place the operator watches the recording instrument 84. The latter is provided with a white light, which remains illuminated during the major portion of the roasting period. It also is provided with a red light which is illuminated at the time when the roasting period is to be terminated by quenching.

Thus, when the instrument 84 shows the red signal the gas in the line 17 is cut off and the main damper 79 is opened slightly. An appropriate amount of water, say for example six gallons, is now fed into the roaster through the internal water jets 71. This is the water which quenches the roast. Immediately after watering the roast, the main damper 79 is then completely closed. The roasted coffee is now pulled from the roaster by removing the door 80 into the discharging position, at which time the vat V will have been moved into position to receive the coffee from the drum 62.

The power agitators 90 in the vat will now be started in operation to properly agitate the coffee during the cooling period. The cooled coffee is now stored and is ready for grinding and packaging.

*Packaging and grinding*

Referring now more particularly to Figure 5, a grinding machine is depicted diagrammatically at 91. Associated with this grinding machine 91 is a storage tank 92 which receives ground coffee through the medium of a conveying spout 93.

A supply of carbon dioxide gas is depicted at 94 and the line 95 extends therefrom down into the storage tank 92. Ground coffee passes from the storage tank 92 to the packaging apparatus which is referred to in its entirety by the reference character P.

A bag which is to receive ground coffee is shown at 96 and is held in open position by the spout 97 of a hopper 98. A line 99 extends from another cylinder of carbon dioxide gas and opens into the bag 96 as the latter receives ground coffee.

When coffee is roasted it loses carbon dioxide gas in large quantities, the quantity gradually diminishing as the coffee cools. The staleness in coffee results from the reaction of coffee with oxygen in the air. Carbon dioxide gas is chemically inert with respect to the coffee and will not react chemically with coffee. Immediately after roasting there is no reaction with the air because the coffee is still giving off quantities of self-contained carbon dioxide gas.

Carbon dioxide has a specific gravity greater than that of air and air will not get to the coffee beans if the latter are completely sheathed in a surrounding atmosphere of carbon dioxide gas.

The principle of this invention involved in the grinding and packaging of coffee is that if the coffee is ground and packaged immediately after cooling, all oxidation may be completely precluded by constantly maintaining the coffee in a protective bath of carbon dioxide gas.

Thus, when coffee is to be ground and delivered to one of the tanks 92, carbon dioxide gas is allowed to flow into the empty tank for several minutes prior to grinding. Due to the specific gravity of the carbon dioxide gas being greater than that of the air, it displaces the air in the tank and, beginning with the bottom, gradually lifts the air level. Thus, when ground coffee falls into the tank from the grinder 91 it falls into an atmosphere of carbon dioxide gas rather than air.

When the packaging machine P is operated carbon dioxide gas is supplied from the line 99 to each package 96 which is to be filled by the ground coffee. Thus, the ground coffee is surrounded by an atmosphere of carbon dioxide gas rather than air and when the package 96 is sealed, all air is substantially eliminated therefrom.

While a preferred specific embodiment of the invention is hereinbefore set forth, it is to be clearly understood that the invention is not to be limited to the exact apparatus and steps illustrated and described because various modifications of these details may be provided in putting the invention into practice within the purview of the appended claims.

What is claimed is:

1. In the roasting of coffee, the method comprising the steps of: (a) placing coffee beans to be roasted in a sealed-in chamber, (b) heating said chamber by means of a flame located externally thereof and in direct communication therewith, and (c) supplementing the natural steam and vapors of the coffee beans by moisture which is introduced into the chamber with the heat coming from said flame.

2. In the roasting of coffee, the method comprising the steps of: (a) introducing a batch of coffee beans to be roasted into a roasting chamber, (b) heating said chamber by a gas flame located externally thereof and in direct conductive communication therewith, (c) accurately controlling the pressure of the gas from which said flame is generated to maintain the heat supplied to the chamber uniform, and (d) adding moisture to said flame to introduce supplemental steam into said chamber.

3. In the roasting coffee, the method comprising the steps of: (a) introducing a batch of coffee beans to be roasted into a sealed-in chamber, (b) supplementing the natural steam and vapors of said coffee beans by moisture which is introduced into said chamber with heat that is directly conducted thereinto, and (c) removing chaff and relieving internal pressures from the sealed-in chamber from time to time.

4. In the roasting of coffee, the method comprising the steps of: (a) introducing a batch of coffee beans to be roasted into a sealed-in chamber, (b) generating heat by a gas flame located externally of said chamber, (c) directly conducting heat from said flame into said chamber, and (d) at the same time introducing added moisture into said chamber with said heat.

5. In the roasting of coffee, the method comprising the steps of: (a) introducing a batch of coffee beans to be roasted into a sealed-in chamber, (b) generating heat by a gas flame located externally of said chamber, (c) directly conducting heat from said flame into said chamber, (d) at the same time introducing added moisture into said chamber with said heat, (e) recording the temperature of the coffee beans during the roasting period, and (f) quenching the roasted coffee upon termination of the roasting period as indicated by said recording.

ROBERT L. MONTGOMERY, Jr.

REFERENCES CITED

The following references are of record in the file of this patent:

UNITED STATES PATENTS

| Number | Name | Date |
|---|---|---|
| 7,329 | Trissler et al. | Apr. 30, 1850 |
| 308,169 | Jennings | Nov. 18, 1884 |
| 598,813 | Pinkerton | Feb. 8, 1898 |
| 1,991,190 | Backer | Feb. 12, 1935 |
| 2,002,094 | Maede | May 21, 1935 |
| 2,017,892 | Clary | Oct. 22, 1935 |
| 2,043,443 | Meyer | June 9, 1936 |
| 2,087,602 | McCrosson | July 20, 1937 |
| 2,099,945 | Simpson | Nov. 23, 1937 |
| 2,129,673 | Burns | Sept. 13, 1938 |
| 2,130,154 | Riley | Sept. 13, 1938 |
| 2,133,559 | Mushhaben et al. | Oct. 18, 1938 |
| 2,292,255 | Pinkerton | Aug. 4, 1942 |
| 2,365,192 | Moore | Nov. 23, 1943 |